United States Patent
Konoshima

(10) Patent No.: US 11,507,476 B2
(45) Date of Patent: Nov. 22, 2022

(54) NOISE ESTIMATION METHOD, NON-TRANSITORY COMPUTER-READABLE STORAGE MEDIUM, AND NOISE ESTIMATION APPARATUS

(71) Applicant: FUJITSU LIMITED, Kawasaki (JP)

(72) Inventor: Makiko Konoshima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 51 days.

(21) Appl. No.: 17/093,686

(22) Filed: Nov. 10, 2020

(65) Prior Publication Data

US 2021/0216416 A1    Jul. 15, 2021

(30) Foreign Application Priority Data

Jan. 9, 2020   (JP) .............................. JP2020-002232

(51) Int. Cl.
| | | |
|---|---|---|
| *G06F 11/00* | (2006.01) | |
| *G06F 11/16* | (2006.01) | |
| *G06F 17/17* | (2006.01) | |
| *G06F 17/16* | (2006.01) | |
| *G06Q 30/02* | (2012.01) | |

(52) U.S. Cl.
CPC ........ *G06F 11/1654* (2013.01); *G06F 11/165* (2013.01); *G06F 17/16* (2013.01); *G06F 17/17* (2013.01); *G06Q 30/0201* (2013.01)

(58) Field of Classification Search
CPC ..... G06F 11/1654; G06F 11/165; G06F 17/16
See application file for complete search history.

(56) References Cited

U.S. PATENT DOCUMENTS

| | | | | |
|---|---|---|---|---|
| 8,675,720 | B2 * | 3/2014 | Doron | ................ H04L 25/0248 375/224 |
| 9,113,241 | B2 * | 8/2015 | Osako | ................ G10L 21/0208 |
| 9,237,038 | B2 * | 1/2016 | Xin | ..................... H04L 25/0204 |
| 9,660,709 | B1 * | 5/2017 | Chavali | ................ H04L 25/067 |
| 10,090,920 | B1 * | 10/2018 | Zhuge | ............. H04B 10/07953 |
| 11,163,980 | B2 * | 11/2021 | Ambai | ................ G06K 9/6232 |
| 2008/0101622 | A1 * | 5/2008 | Sugiyama | ............. H04R 3/002 381/94.1 |
| 2011/0051956 | A1 * | 3/2011 | Jeong | ................ G10L 21/0208 381/94.1 |

(Continued)

FOREIGN PATENT DOCUMENTS

| | | |
|---|---|---|
| JP | 2013-526237 A | 6/2013 |
| JP | 2017-83441 A | 5/2017 |

(Continued)

OTHER PUBLICATIONS

Wan, Changlin et al., "MEBF: A Fast and Efficient Boolean Matrix Factorization Method", arxiv.org, Cornell University Library, 201 Olin Library Cornell University Ithaca, NY 14853, pp. 1-10, Sep. 9, 2019, XP081475649.

(Continued)

*Primary Examiner* — Esaw T Abraham
(74) *Attorney, Agent, or Firm* — Fujitsu Patent Center

(57) ABSTRACT

A noise estimation method includes decomposing a first matrix in which values of elements are represented by binary values into a coefficient matrix and a basic matrix, and estimating an element including noise among elements of the first matrix based on a result of comparison between a second matrix obtained by combining the coefficient matrix with the basic matrix and the first matrix.

7 Claims, 14 Drawing Sheets

(56) References Cited

U.S. PATENT DOCUMENTS

2011/0276682 A1  11/2011  Ding et al.
2019/0042543 A1   2/2019  Konoshima

FOREIGN PATENT DOCUMENTS

| JP | 2017-207577 A | 11/2017 |
| --- | --- | --- |
| JP | 2019-028896 A | 2/2019 |
| WO | 2011/140293 A2 | 11/2011 |

OTHER PUBLICATIONS

Belohlavek, Radim et al., "Handling noise in Boolean matrix factorization", International Journal of Approximate Reasoning, vol. 96, pp. 78-94, May 1, 2018, XP055796934.
Extended European Search Report dated Apr. 30, 2021 for corresponding European Patent Application No. 20205603.2, 10 pages.
*Please note US-2019/0042543-A1 and NPL Miettinen, P. et al., "MDL4BMF: Minimum Description Length for Boolean Matrix Factorization . . . " cited herewith were previously cited in an IDS filed on Nov. 10, 2020.*.
Zhongyuan Zhang et al., "Binary Matrix Factorization with Applications", ICDM, 2007 (Total 10 pages).
Pauli Miettinen et al., "MDL4BMF: Minimum Description Length for Boolean Matrix Factorization", TKDD(Trans. Knowl. Discov. Data), from Data, vol. 8, No. 4, Article 18, Oct. 2014, pp. 1-31 (Total 31 pages).
Takato Nakamura et al., "Formulation of Ising Model for Binary Matrix Factorization", FIT 2017 (The 16 Information Science and Technology Forum), pp. 277-278, 2017 (Total 4 pages).

* cited by examiner

FIG. 3
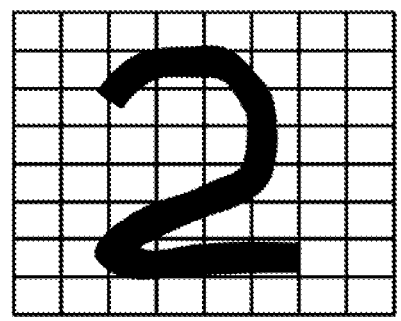
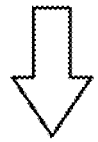
|  | FIRST PIXEL | SECOND PIXEL | THIRD PIXEL | FOURTH PIXEL | ... V2 |
|---|---|---|---|---|---|
| 1 WRITTEN BY A | 1 | 0 | 1 | 0 | 0 |
| 1 WRITTEN BY B | 0 | 0 | 1 | 0 | 0 |
| ... | | | | | |
| 9 WRITTEN BY A | 0 | 1 | 1 | 1 | 1 |
| ... | | | | | |

FIG. 11

| RELEVANCE FACTOR P AND RECALL FACTOR R AVERAGE VALUES ||
|---|---|
| P | R |
| 0.991 | 0.818 |

FIG. 12

| | CROSS-VALIDATION ERROR ||
| --- | --- | --- |
| | BEFORE NOISE REMOVAL | AFTER REMOVAL |
| | 0.32 | 0.25 |

NOISE ESTIMATION METHOD, NON-TRANSITORY COMPUTER-READABLE STORAGE MEDIUM, AND NOISE ESTIMATION APPARATUS

CROSS-REFERENCE TO RELATED APPLICATION

This application is based upon and claims the benefit of priority of the prior Japanese Patent Application No. 2020-2232, filed on Jan. 9, 2020, the entire contents of which are incorporated herein by reference.

FIELD

The embodiment discussed herein is related to a noise estimation method, a non-transitory computer-readable storage medium, and a noise estimation apparatus.

BACKGROUND

Up to now, a technique for decomposing a matrix has been proposed. For example, a matrix generated from collected data is decomposed into a coefficient matrix and a basic matrix, so that a pattern for each predetermined category regarding the data may be analyzed.

Related techniques are disclosed in for example Japanese National Publication of International Patent Application No. 2013-526237 and No. 2017-207577, and "Binary matrix factorization with applications", The Seventh IEEE International Conference on Data Mining (ICDM).

SUMMARY

According to an aspect of the embodiments, a noise estimation method includes decomposing a first matrix in which values of elements are represented by binary values into a coefficient matrix and a basic matrix, and estimating an element including noise among elements of the first matrix based on a result of comparison between a second matrix obtained by combining the coefficient matrix with the basic matrix and the first matrix.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of the binary matrix.

FIG. 11 is a diagram illustrating a relevance factor and a recall factor in the experiments.

FIG. 12 is a diagram illustrating a cross-validation error in the experiments.

DESCRIPTION OF EMBODIMENTS

In the related art, a problem occurs that it is difficult to precisely decompose a binary matrix in some cases.

For example, for a purpose of analyzing a product purchase pattern by customers, a history on whether respective products for each customer are purchased or not may be represented by a binary matrix in some cases. A discrete value such as a response to a multiple-choice query may be converted into a binary value in some cases.

Hereinafter, an embodiment of a noise estimation method, a noise estimation program, and a noise estimation apparatus according to the present invention will be described in detail with reference to the drawings. The embodiment does not limit the present invention. Each embodiment may be combined as appropriate within a scope without contradiction.

Embodiment 1

Figure 1:
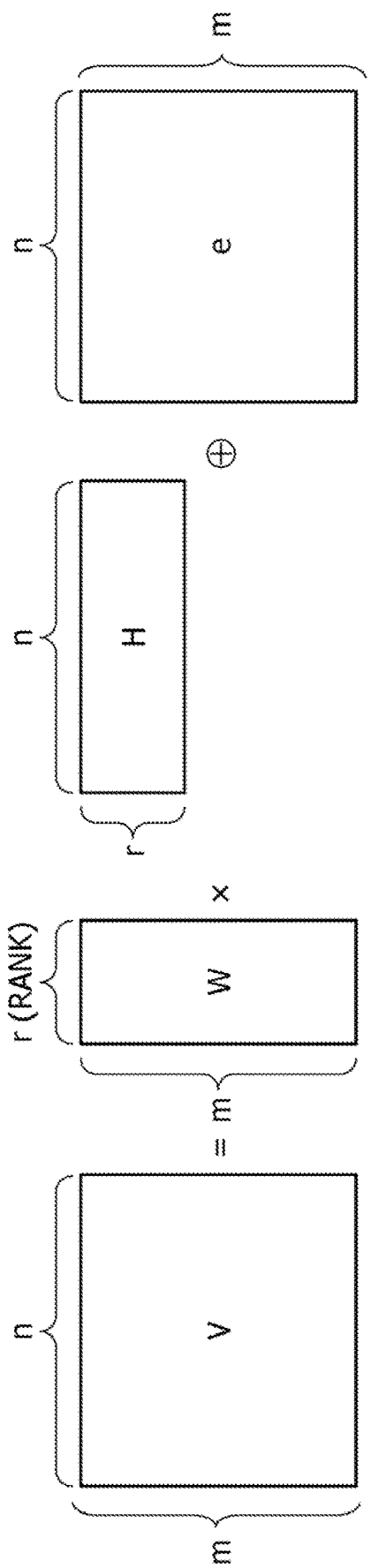
FIG. 1 is an explanatory diagram for describing matrix decomposition.

First, matrix decomposition is described with reference to FIG. 1. FIG. 1 is an explanatory diagram for describing the matrix decomposition. As illustrated in FIG. 1, an n×m matrix V is decomposed into an r×m coefficient matrix W and an n×r basic matrix H. When the decomposition is approximately performed, an n×m noise matrix e may be assumed. Where m, n, and r denote an integer of 1 or above. A rank specified for a calculation is denoted by r.

According to the present embodiment, a value of an element of a matrix is represented by a binary value (Boolean). In the following explanation, such a matrix may be referred to as a binary matrix in some cases. A value of an element of the binary matrix may be represented by a numeric value 0 or 1, or may be represented by TRUE or FALSE. According to the present embodiment, the value of the element of the binary matrix is represented by 0 or 1, but multiplication and addition are performed according to Boolean operation rules. The addition of the binary matrix and noise is set as a residue system of 2.

Figure 2:
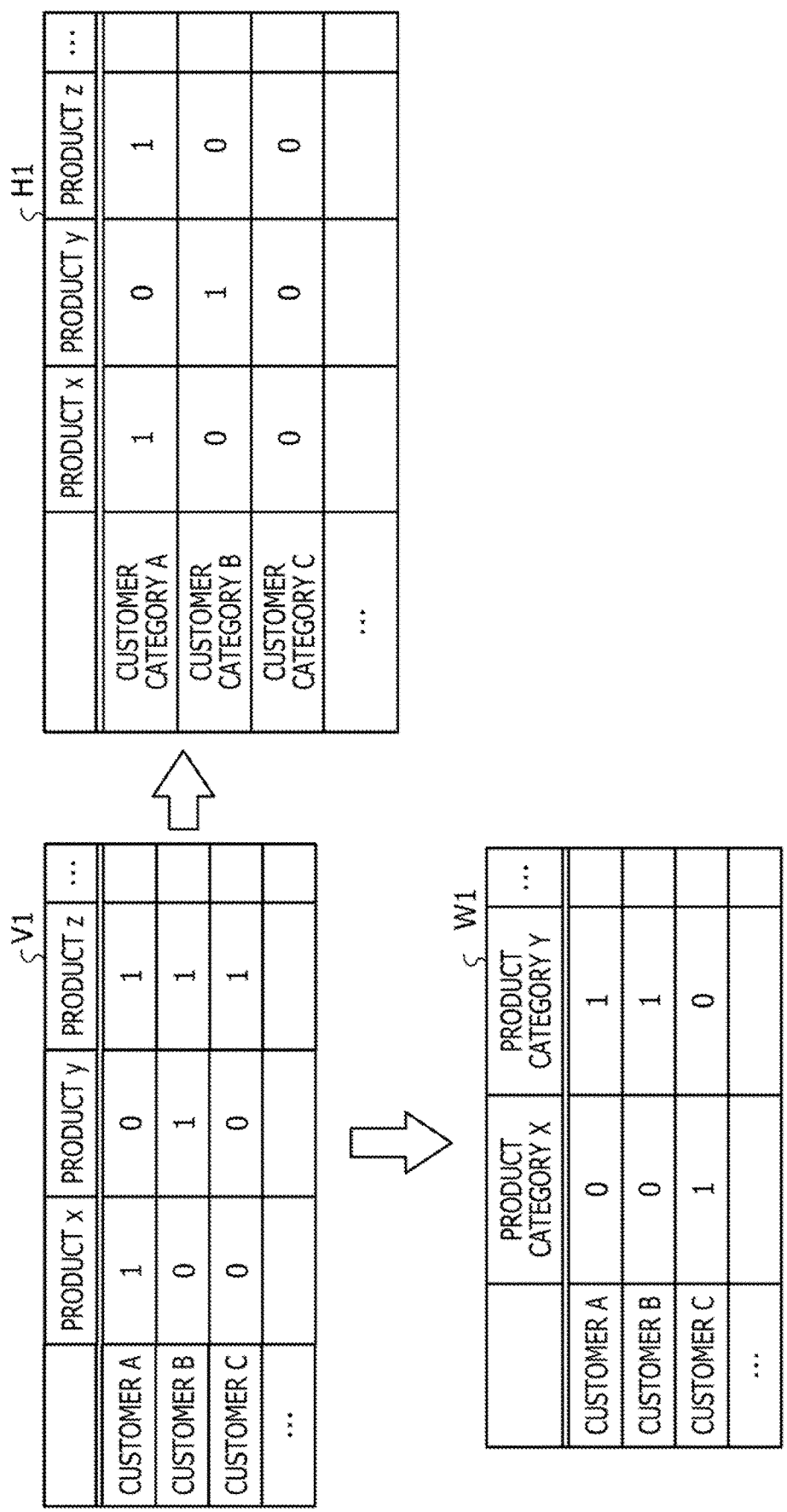
FIG. 2 is a diagram illustrating an example of a binary matrix, a coefficient matrix, and a basic matrix.

The decomposition of the binary matrix is used to analyze various data. FIG. 2 is a diagram illustrating an example of the binary matrix, the coefficient matrix, and the basic matrix. The binary matrix V1 represents product purchase histories by customers. Each row of the binary matrix V1 corresponds to a customer. Each column of the binary matrix V1 corresponds to a product. When a value of an element of the binary matrix V1 is 1, this means that the corresponding customer has purchased the corresponding product once or more. When the value of an element of the binary matrix V1 is 0, this means that the corresponding customer has not purchased the corresponding product yet.

For example, the binary matrix V1 indicates that a customer A has purchased a product x and a product z. For example, the binary matrix V1 indicates that a customer B has purchased a product y. In the binary matrix V1, even when the customer has purchased the same product twice or more, the value of the relevant element is 1 according to the Boolean operation rules.

The binary matrix V1 is decomposed into the coefficient matrix W1 and the basic matrix H1. The coefficient matrix W1 represents a purchase pattern for each customer. The basic matrix H1 represents a purchase pattern for each customer segment.

In this case, it is conceivable that noise is generated when the customer has conducted purchase out of an original purchase pattern such as "purchase of a rarely purchased product" or "purchase due to a request from other people by chance". For this reason, when a model is generated by removing the noise estimated based on the coefficient matrix W1 and the basic matrix H1 from the binary matrix V1, an analysis may be performed on how likely each customer purchases which product.

As illustrated in FIG. 3, an image of a target image recognition may be represented by a binary matrix. FIG. 3 is a diagram illustrating an example of the binary matrix. For example, the binary matrix V2 in FIG. 3 is created by arranging values indicating information for each pixel in one dimension in a row direction, which are obtained by performing raster scanning of images of characters from left to right and from top to bottom in which predetermined numbers are written by different writers.

The coefficient matrix obtained by decomposing the binary matrix V2 may be regarded as the characteristic amount of the compressed image. The basic matrix obtained by decomposing the binary matrix V2 may be regarded as the base. The noise generated when the binary matrix V2 is decomposed may be regarded as the noise of the image. When a model for clustering handwritten numbers displayed on images is generated based on the binary matrix V2 from which the noise is removed, model clustering precision may be increased as compared with a case where the noise is not removed.

When image data is based on a grayscale 8-bit format, a pixel value is represented in a range between 0 to 255. In the binary matrix, for example, when the pixel value is 0, the value of the element may be set as 0, and when the pixel value is other than 0, the value of the element may b set as 1.

When various data pieces are analyzed using the model obtained by decomposing the binary matrix, the precision is affected by an influence of the rank specified when the decomposition is performed A method for deciding the rank is referred to as model selection. For example, a technique for evaluating the model selection in terms of the description length has been proposed (Reference Literature 1: Miettinen et al. "MDL4BMF: Minimum Description Length for Boolean Matrix Factorization", TKDD, Volume 8 Issue 4, October 2014 Article No. 18).

The noise estimation apparatus according to the present embodiment may remove the noise when the binary matrix is decomposed using a predetermined rank from the original binary matrix. Thus, the precision of the data analysis using the binary matrix is improved. The rank may be decided by any method including a related-art method.

Functional Configuration

A configuration of a noise estimation apparatus 10 according to an embodiment is described with reference to FIG. 4.

Figure 4:
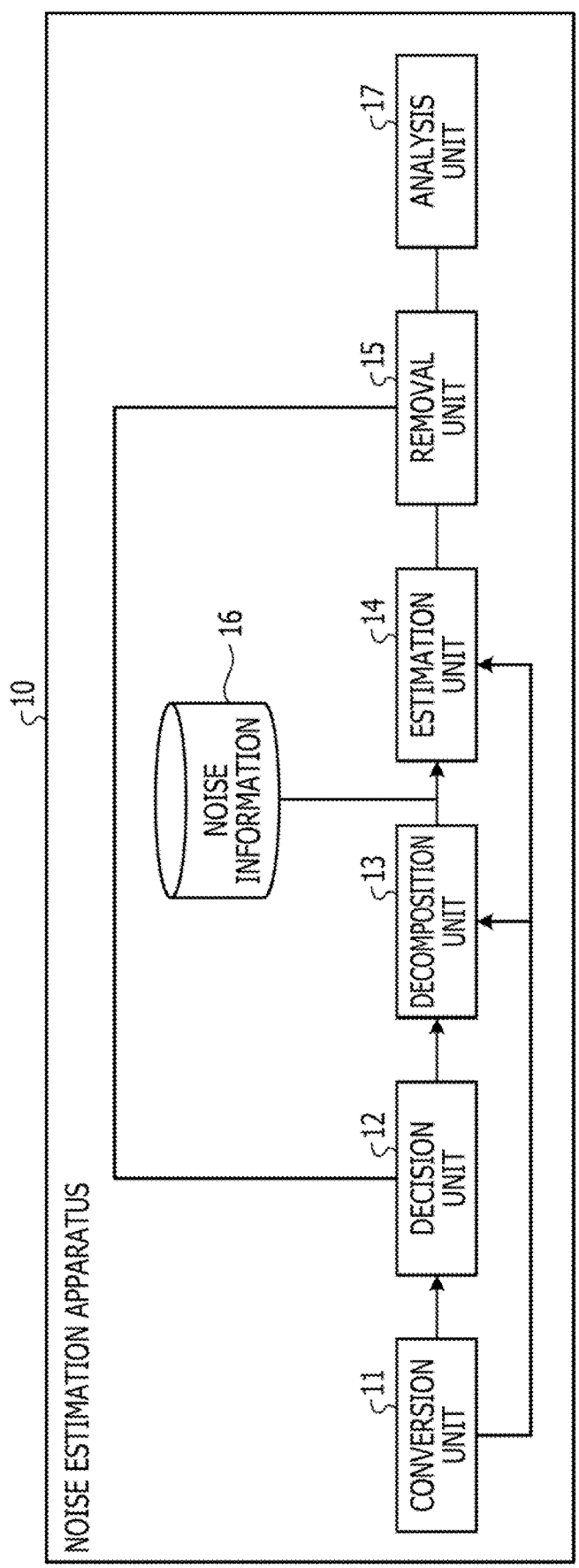
FIG. 4 is a block diagram illustrating a configuration example of a noise estimation apparatus.

FIG. 4 is a block diagram illustrating a configuration example of the noise estimation apparatus. As illustrated in FIG. 4, the noise estimation apparatus 10 includes a conversion unit 11, a decision unit 12, a decomposition unit 13, an estimation unit 14, a removal unit 15, noise information 16, and an analysis unit 17.

The conversion unit 11 converts analysis target data into a binary matrix. For example, the conversion unit 11 converts the data into a matrix in which respective elements correspond to respective pixel of the images represented in the grayscale 8-bit format. The conversion unit 11 sets the value of the element as 0 when the pixel value of the corresponding pixel is 0, and sets the value of the element as 1 when the pixel value of the corresponding pixel is other than 0.

The decision unit 12 decides a rank at which a description length satisfying a predetermined condition, the description length is based on a first matrix in which values of the elements are represented by binary values, and a coefficient matrix and a basic matrix obtained by decomposing the first matrix.

The decomposition unit 13 decomposes the first matrix in which the values of the elements are represented by the binary values into the coefficient matrix and the basic matrix. The decomposition unit 13 approximately decomposes the first matrix under the rank decided by the decision unit 12. The decomposition unit 13 decomposes the first matrix plural times by a technique with which the coefficient matrix and the basic matrix obtained by the decomposition do not have uniqueness. Markov chain Monte Carlo methods (MCMC) (Reference Literature 2: Japanese Laid-open Patent Publication No. 2019-028896) is an example of the technique with which the coefficient matrix and the basic matrix obtained by the decomposition do not have uniqueness.

The estimation unit 14 generates a second matrix by combining the coefficient matrix with the basic matrix, and estimates the element including the noise among the elements of the first matrix based on a result of a comparison between the second matrix and the first matrix. The estimation unit 14 estimates, as the noise, the element of the first matrix corresponding to the element where the value is true among elements of a third matrix obtained by the addition of the residue system of 2 of the second matrix and the first matrix. According to the present embodiment, 1 represents true, and 0 represents false.

For example, the estimation unit 14 estimates, as the noise, the element of the first matrix corresponding to the element where a ratio of the values that are true is equal to or higher than a threshold among the elements of the third matrix obtained by the addition of the residue system of 2 of each of the multiple second matrices and the first matrix. The multiple second matrices are obtained by combining the coefficient matrix and the basic matrix obtained by the decomposition unit 13.

According to the present embodiment, the decision unit 12 and the decomposition unit 13 perform the matrix decomposition using the MCMC described in Reference Literature 1. The decision unit 12 and the decomposition unit 13 may perform the matrix decomposition by the method described in Reference Literature 3 (Nakamura, et al., "Formulation of Ising model for binary matrix factorization", FIT2017).

The noise information 16 is information in which the noise estimated by the estimation unit 14 is accumulated. The estimation unit 14 performs the noise estimation plural times. Each time the noise is estimated, the estimation unit 14 accumulates the estimated noise in the noise information 16.

The removal unit 15 removes the noise by inverting the value of the element estimated as the noise by the estimation unit 14 among the elements of the first matrix. According to the present embodiment, the removal unit 15 may remove the noise by bit inversion. For example, when the value of the element estimated as the noise is 1, the removal unit 15 converts the value of this element into 0. For example, when the value of the element estimated as the noise is 0, the removal unit 15 converts the value of this element into 1.

The analysis unit 17 analyses the data using the binary matrix from which the noise is removed. For example, the analysis unit 17 may generate a clustering model for clustering the data or may perform data anomaly detection based on the binary matrix from which the noise is removed.

Overall Processing Flow

Figure 5:
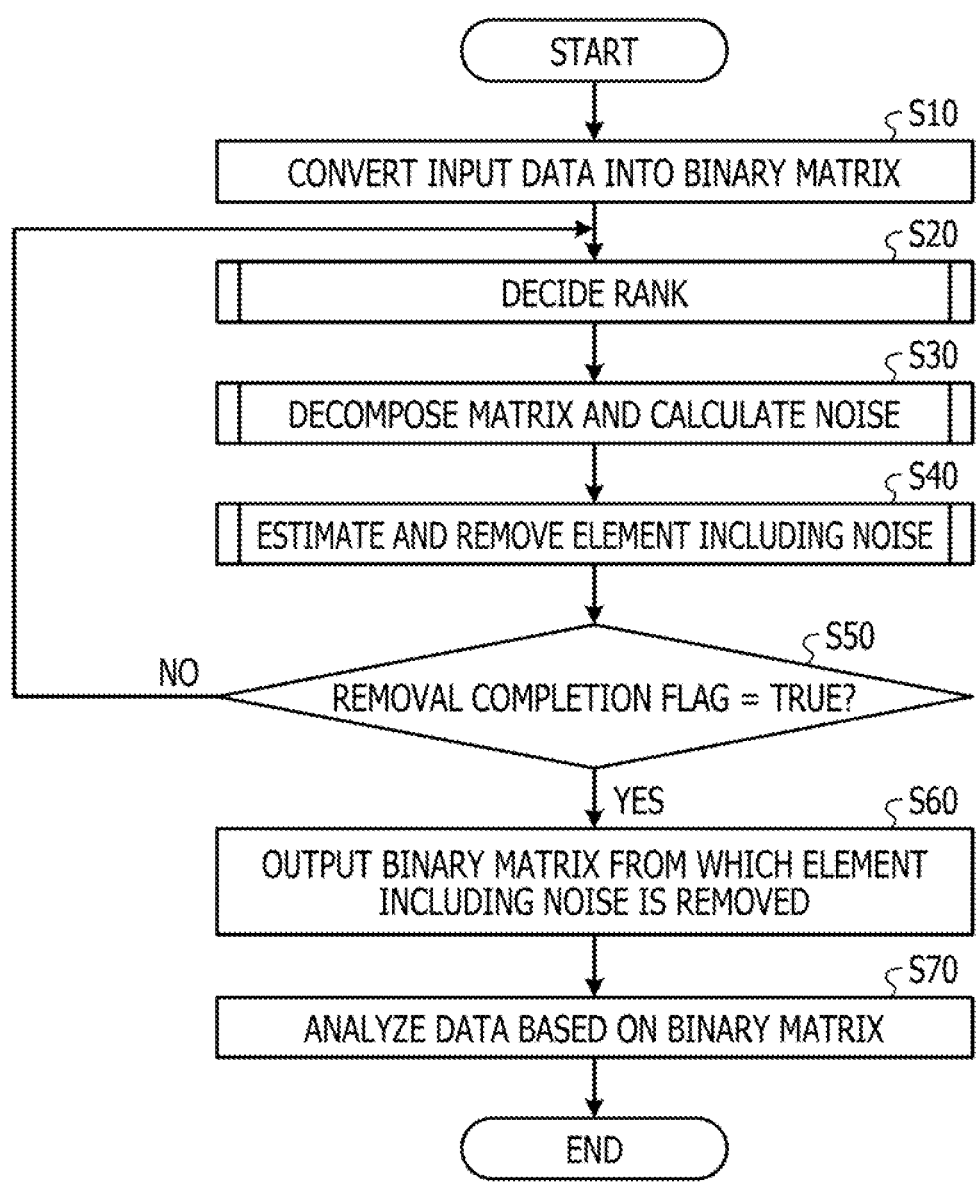
FIG. 5 is a flowchart illustrating a flow of processing of the noise estimation apparatus.

A processing flow is described using flowcharts. First, an overall processing flow is described with reference to FIG. 5. FIG. 5 is a flowchart illustrating a processing flow of the noise estimation apparatus. As illustrated in FIG. 5, first, the conversion unit 11 of the noise estimation apparatus 10 converts data that has been input (hereinafter, input data) into a binary matrix (step S10).

Next, the decision unit 12 decides a rank for decomposing the binary matrix (step S20). The decomposition unit 13 performs matrix decomposition and noise calculation under the rank decided by the decision unit 12 (step S30).

The estimation unit 14 estimates the element including the noise in the binary matrix. The removal unit 15 removes the noise estimated by the estimation unit 14 (step S40). When a removal completion flag indicating whether or not the noise removal is completed is TRUE (step S50: Yes), the removal unit 15 outputs the binary matrix from which the element including the noise is removed (step S60). When the removal completion flag indicating whether or not the noise removal is completed is not TRUE (step S50: No), the noise estimation apparatus 10 returns to step S20, and repeats the processing. After step S60, the analysis unit 17 analyzes the data based on the binary matrix (step S70).

In this manner, the noise estimation apparatus 10 repeats the processing until the noise removal is completed. For example, each time the element including the noise is estimated by the estimation unit 14, when a sum of the number of elements estimated as the noise is higher than a threshold, the removal unit 15 removes the noise from the first matrix. Each time the removal unit 15 removes the noise, the decomposition unit 13 further decomposes the first matrix. Each time the decomposition unit 13 decomposes the first matrix, the estimation unit 14 further estimates the element including the noise among the elements of the first matrix. The decision unit 12 may decide the rank again between the aforementioned processing by the removal unit 15 and the processing by the decomposition unit 13 or may avoid deciding the rank again.

Detail of Respective Processes

Hereinafter, details of respective processes (steps S20, S30, and S40) in FIG. 5 are described. First, the input data may be represented by a redundant matrix, and it is also assumed that noise exists. A state where the matrix is redundant means that the matrix has a structure where the matrix may be decomposed into two or more matrices.

In the n×m binary matrix after the conversion by the conversion unit 11, n pieces of instances $v_1, v_2, v_n$ respectively represented by m-dimensional vectors are coupled to one another. For example, the binary matrix may be written as $V=\{v_1, v_2 \ldots v_n\}^T$ using T meaning transposition.

For example, the input data includes category data, discrete value data, and binary data. The category data includes, for example, query data and a gene base sequence. The discrete value data includes, for example, a counting numeric value such as a counter value of a car or human flow. The binary data is data represented by two values indicating whether a product is purchased and whether product is not purchased, for example. The conversion unit 11 converts the input data into $\{0, 1\}$. Therefore, $V \in \{0, 1\}^{n \times m}$ is established.

For example, the gene base sequence data is represented by a combination of four types of characters including t, c, g, and a. For example, the gene base sequence data includes "tactagcaatacgcttgcgttcggtggttaagtatgtataatgcgcgggcttgtcgt" and "tgctatcctgacagttgtcacgctgattggtgtcgttacaatctaacgcatcgccaa".

(Source: UCI Machine Learning Repository Molecular Biology (Promoter Gene Sequences) Data Set (URL:https://archive.ics.uci.edu/ml/datasets/Molecular+Biology+(Promoter+Gene+Sequences)))

When the conversion unit 11 sets t=$\{0, 0, 0, 1\}$, t=$\{0, 0, 1, 0\}$, t=$\{0, 1, 0, 0\}$, and t=$\{1, 0, 0, 0\}$, the gene base sequence data may be converted into the binary matrix. For example, the conversion unit 11 converts "tactagc" into $\{0, 0, 0, 1, 1, 0, 0, 0, 0, 0, 1, 0, 0, 0, 0, 1, 1, 0, 0, 0, 0, 1, 0, 0, 0, 0, 1, 0\}$.

The conversion unit 11 may convert response data of a query with response options 1 to 5 into the binary matrix such as 1=$\{0, 0, 0, 0, 1\}$, 2=$\{0, 0, 0, 1, 0\}$, 3=$\{0, 0, 1, 0, 0\}$, for example. The conversion unit 11 may convert a value of the counter (0 or a natural number) into the binary matrix by performing binary expansion. Multi-value data such as the aforementioned grayscale in the image may be converted into the binary matrix by setting a value other than 0 as 1. The conversion unit 11 may directly convert data representing a user action such as {performed, not performed} into $\{1, 0\}$.

Since the characteristic amount of the input data is redundant and also noise may exist, a format such as Expression (1) may be assumed.

[Expression 1]

$$V = (W \circ H) \oplus e \tag{1}$$

Where ∘ means a product of a matrix according to the Boolean operation rules.

⊕ means an addition of a residue system of 2.

$W \in \{0, 1\}^{n \times r}$, $H \in \{0, 1\}^{r \times m}$, and $e \in \{0, 1\}^{n \times m}$, are established. In the operation according to the Boolean operation rules, 0+0=0, 0+1=1, 1+0=1, and 1+1=1 are established. In the addition of the residue system of 2, 0+0=0, 0+1=1, 1+0=1, and 1+1=0 are established. The element in which noise exists is an element where the value is 1 among the elements of e.

Decision of Rank

Processing for deciding a rank (step S20 in FIG. 5) is described in detail. The decision unit 12 provides several rank candidates to perform matrix decomposition, and decides a rank $r_0$ at which a description length (DL) is the minimum as an optimal rank. When the DL monotonically increases with respect to the rank, it is conceivable that the binary matrix does not follow a supposed model. In such a case, the decision unit 12 may output a result that the rank decision is not available or assume the lowest rank among the ranks where the DL is calculated as the optimal rank.

Figure 6:
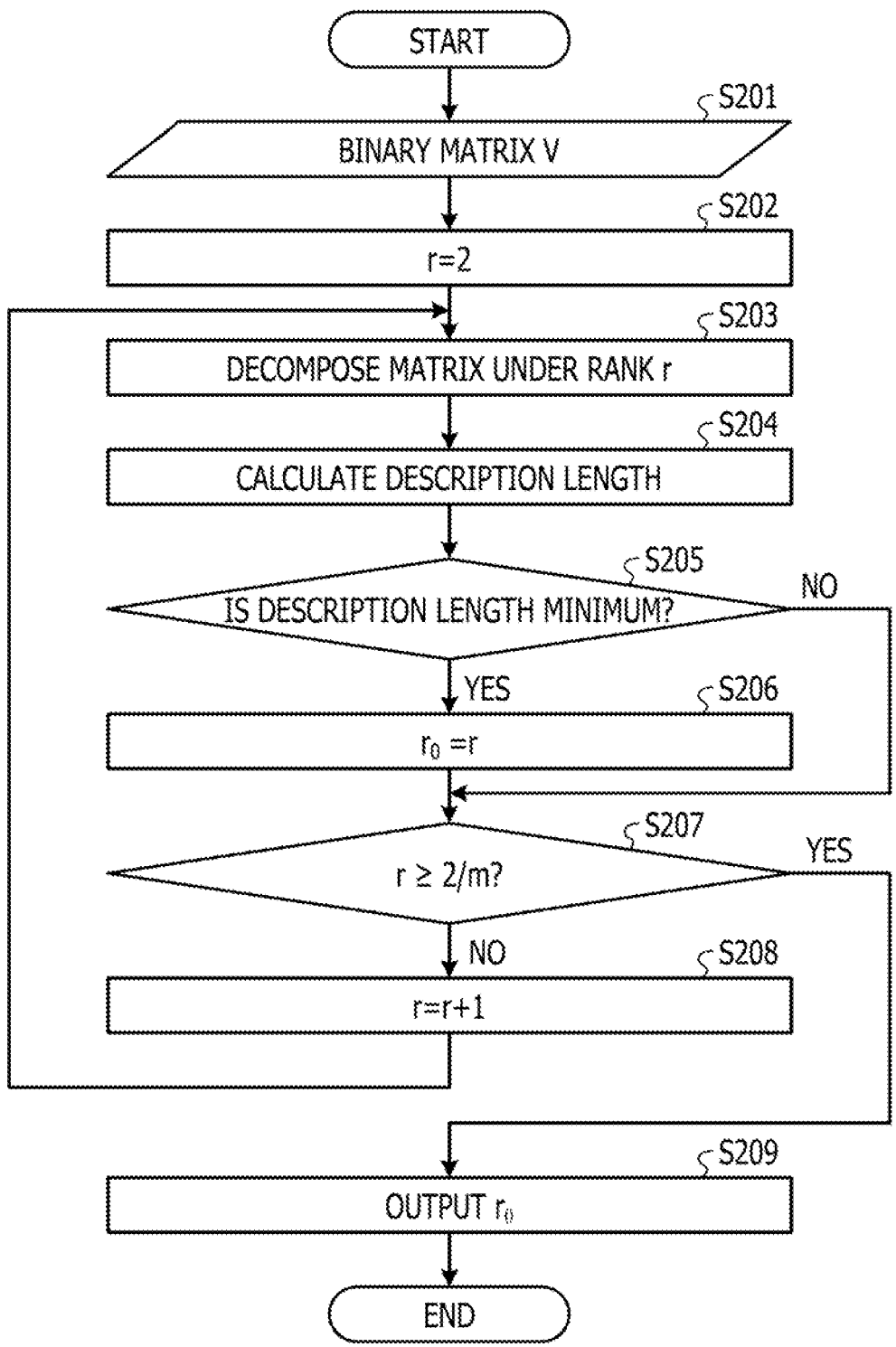
FIG. 6 is a flowchart illustrating a flow of processing for deciding a rank.

FIG. 6 is a flowchart illustrating a flow of the processing for deciding the rank. As illustrated in FIG. 6, first, the decision unit 12 receives the binary matrix V (step S201). The decision unit 12 sets an initial value of the rank r as 2 (step S202). The decision unit 12 performs matrix decomposition under the rank r to obtain a format of Expression (2) (step S203).

[Expression 2]

$$V \cong W \circ H \qquad (2)$$

The decision unit 12 calculates the description length based on the coefficient matrix and the basic matrix obtained by the matrix decomposition (step S204). The decision unit 12 may calculate the description length by the method described in Reference Literature 1, for example. The decision unit 12 calculates the description length L (V, W, H) as in Expression (3), Expression (4), Expression (5), and Expression (6).

[Expression 3]

$$L(V, W, H) = L(W) + L(H) + L(V \mid W, H) \qquad (3)$$

[Expression 4]

$$L(W) = k\log(n) + \sum_{i=1}^{k} \log\binom{n}{|W^i|} \qquad (4)$$

[Expression 5]

$$L(E^+) = \log(mn - |W \circ H|) + \sum_{i=1}^{k} \log\binom{mn - |W \circ H|}{|E^+|} \qquad (5)$$

Where $$\binom{A}{B}$$

is a binomial coefficient, $$\frac{A!}{B!(A-B)!}$$

is established.

[Expression 6]

$$L(E^-) = \log(|W \circ H|) + \sum_{i=1}^{k} \log\binom{|W \circ H|}{|E^-|} \qquad (6)$$

When the description length calculated for the rank r is the minimum (step S205: Yes), the decision unit 12 assigns the set rank r to an optimal rank $r_0$ (step S206). When the description length calculated for the rank r is not the minimum (step S205: No), the decision unit 12 does not change the optimal rank $r_0$.

When r is not above 2/m (step S207: No), the decision unit 12 increases r by 1 (step S208), and returns to step S203 to repeat the processing. When r is above 2/m (step S207: Yes), the decision unit 12 outputs $r_0$ and ends the processing (step S209).

Figure 7:
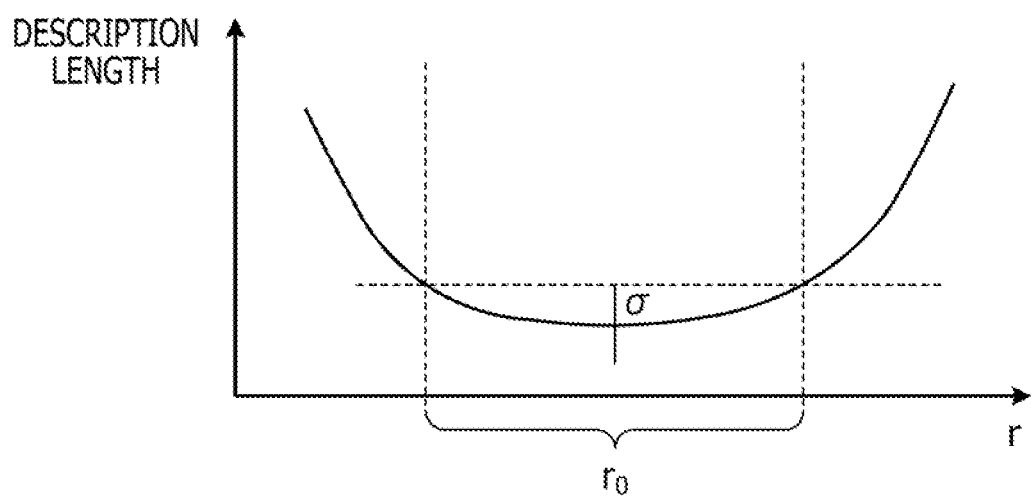
FIG. 7 is an explanatory diagram for describing an optimal description length.

The optimal description length is described with reference to FIG. 7. FIG. 7 is an explanatory diagram for describing the optimal description length. As illustrated in FIG. 7, the description length is a curve that is convex downward with respect to the rank. The curve of the description length may be very gentle in some cases. When the matrix decomposition is performed plural times by a technique based on the Monte Carlo method such as the MCMC, solutions do not have uniqueness, and an average of the lowest values of the description length for each attempt and a standard deviation σ are obtained. In view of the above, the decision unit 12 may select multiple rank as the optimal ranks $r_0$ with which the description length is within a range from the average of the lowest values to the average of the lowest values+the standard deviation σ. The decision unit 12 may select a lowest rank among the ranks with which the description length is within the range from the average of the lowest values to the average of the lowest values+the standard deviation σ.

When the matrix decomposition is performed by a technique other than the Monte Carlo method, the decision unit 12 may decide the rank at which the description length takes the lowest value as $r_0$.

Matrix Decomposition and Noise Calculation

Details of the matrix decomposition and the noise calculation are described (step S30 in FIG. 5). The decomposition unit 13 decomposes the binary matrix under the rank decided by the decision unit 12. The decomposition unit 13 may appropriately use a result of the matrix decomposition by the decision unit 12.

Figure 8:
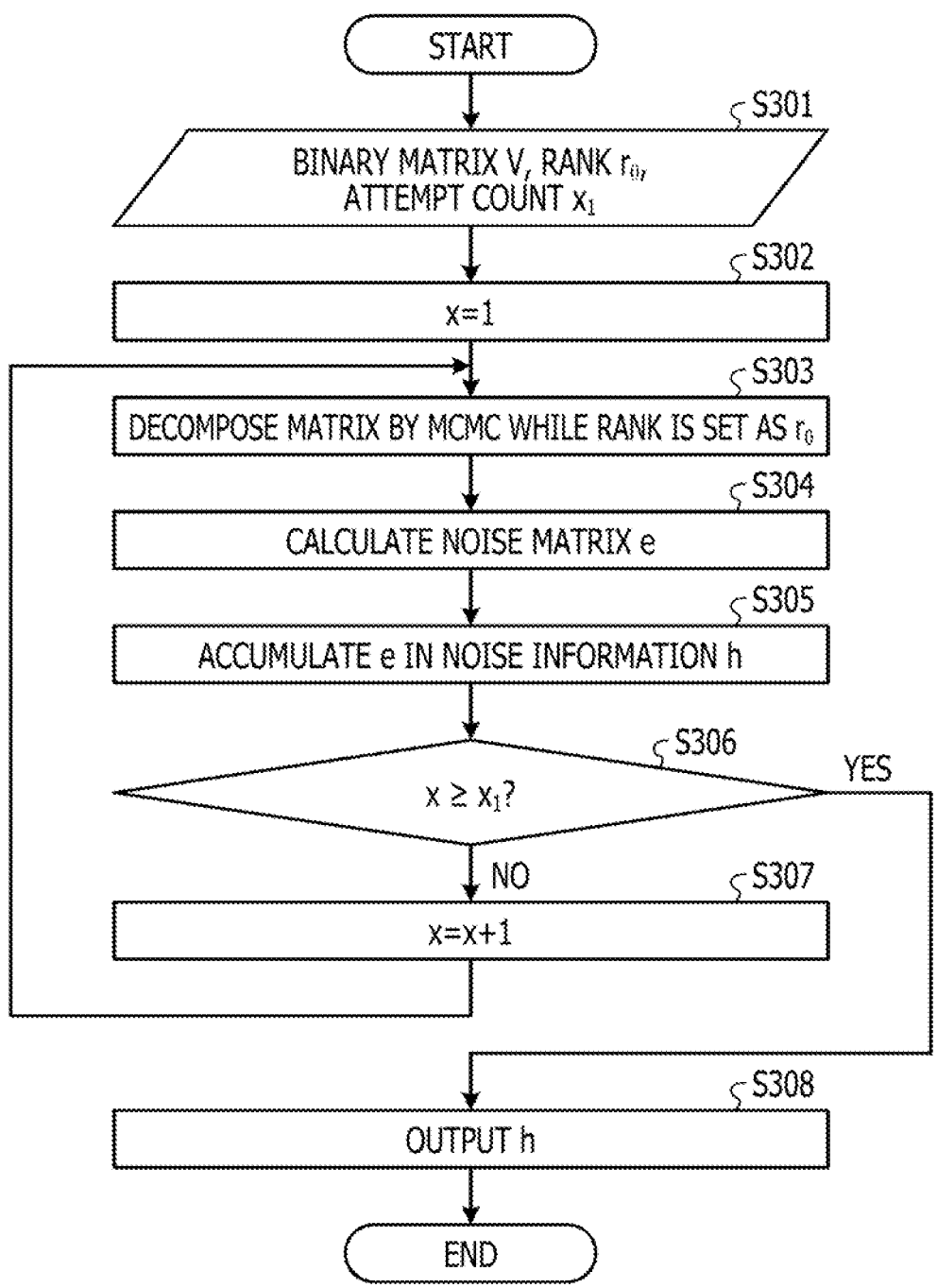
FIG. 8 is a flowchart illustrating a flow of processing for decomposing a matrix and calculating noise.

FIG. 8 is a flowchart illustrating a flow of processing for decomposing the matrix and calculating the noise. As illustrated in FIG. 8, the decomposition unit 13 receives the binary matrix V, the rank $r_0$ and an attempt count $x_1$ (step S301). The decomposition unit 13 assigns 1 to x representing the current attempt count (step S302).

The decomposition unit 13 performs the matrix decomposition by the MCMC on the binary matrix V while the rank is set as $r_0$ (step S303). The estimation unit 14 calculates the noise matrix e as in Expression (7) (step S304).

[Expression 7]

$$e = V \oplus (W \circ H) \qquad (7)$$

The estimation unit 14 accumulates the calculated noise matrix e in noise information h (step S305). For example, the noise information h may be a matrix in which the element value is a multi-value. In this case, the estimation unit 14 adds the calculated noise matrix e to the noise information h each time the processing is repeated.

When x is not equal to or higher than $x_1$ (step S306: No), the estimation unit 14 increases x by 1 (step S307), and returns to step S303 to repeat the processing. When x is equal to or higher than $x_1$ (step S306: Yes), the estimation unit 14 outputs the noise information h (step S308).

V in Expression (7) is an example of a first matrix. The matrix obtained by combining W with H in Expression (7) is an example of a second matrix. The noise matrix e in Expression (7) is an example of a third matrix.

Estimation and Removal of Element including Noise

Details of the estimation and the removal of the element including the noise are described (step S40 in FIG. 5). For example, in the element having a high frequency that the value is 1 in the noise matrix e, it is conceivable that the value is also high in the noise information h. The estimation unit 14 estimates the element including the noise among the elements of the binary matrix V by using this phenomenon.

The noise matrix e, the binary matrix V, and the noise information h are all an n×m matrix. For this reason, for example, the element in column p, row q in the noise matrix e corresponds to the elements in column p, row q in the binary matrix V and the noise information h.

Figure 9:
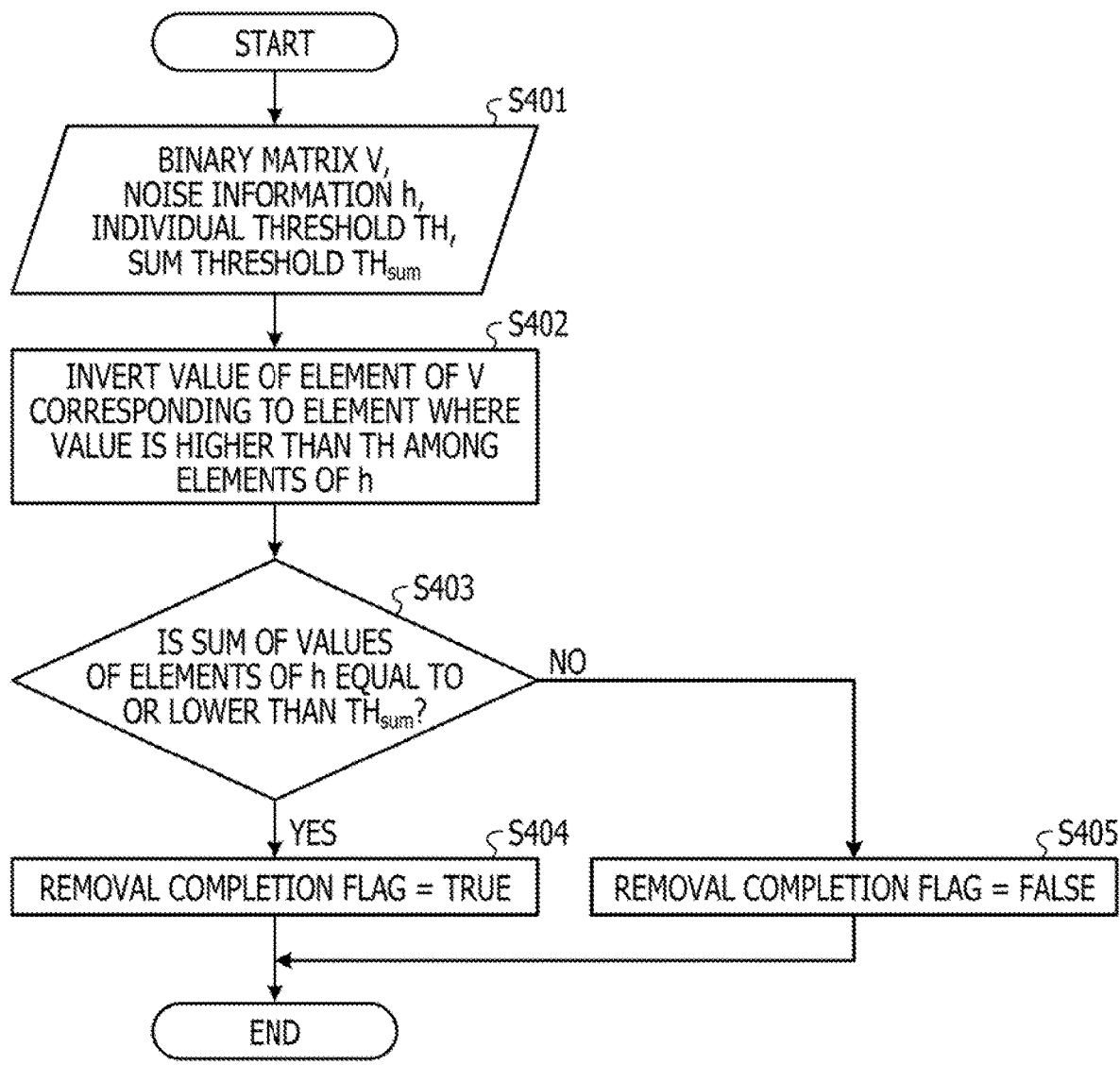
FIG. 9 is a flowchart illustrating a flow of processing for estimating and removing an element including noise.

FIG. 9 is a flowchart illustrating a flow of processing for estimating and removing the element including the noise. As illustrated in FIG. 9, the estimation unit 14 receives the binary matrix V, the noise information h, an individual threshold TH, and a sum threshold $TH_{sum}$ (step S401).

The estimation unit 14 estimates the element of V corresponding to the element where the value is higher than TH among the elements of the noise information h as the element including the noise. The removal unit 15 inverts the value of the element including the noise (step S402). Next, when the sum of the values of the elements of h is equal to or lower than $TH_{sum}$ (step S403: Yes), the removal unit 15 sets the removal completion flag as TRUE (step S404). When the sum of the values of the elements of h is not equal to or lower than $TH_{sum}$ (step S403: No), the removal unit 15 sets the removal completion flag as FALSE (step S405).

As illustrated in FIG. 5, the noise estimation apparatus 10 repeats the processes from steps S20 to S40 until the removal completion flag turns to TRUE. For this reason, the removal unit 15 may initialize the noise information h after step S405 or S406.

The individual threshold TH and the sum threshold $TH_{sum}$ are previously specified. The individual threshold TH and the sum threshold $TH_{sum}$ may be an absolute value or a value representing a ratio. In this case, the individual threshold TH may be regarded as a ratio of the number of times when the noise is decided to the attempt count. The sum threshold $TH_{sum}$ may be regarded as a ratio of the number of the elements estimated as the noise to the number of elements n×m of the matrix.

Data Analysis

The analysis unit 17 analyses the data based on the binary matrix V and/or the noise information h, the binary matrix V being removed the noise. For example, when the anomaly detection is performed, the analysis unit 17 may sequentially output the corresponding elements of the binary matrix V in a descending order of the value of the element of the noise information h as an abnormal element.

The removal unit 15 may set several candidates of initial values of the individual threshold TH and the sum threshold $TH_{sum}$ by using labeled test data. At this time, the analysis unit 17 performs k-fold cross-validation to calculate a cross-validation loss L by using the binary matrix V from which the noise is removed or the coefficient matrix W in which the matrix decomposition or dimensional compression is performed.

The analysis unit 17 selects a binary matrix after the noise removal at the threshold at which the cross-validation loss L is the lowest among the candidates of the threshold TH and sets the binary matrix as $V_0$. The removal unit 15 may sequentially decrease the threshold TH from the highest value among the values of the elements of the noise information h until the cross-validation loss L calculated by the analysis unit 17 is decreased approximately to an extent that a predetermined reference is satisfied. The removal unit 15 may set the threshold TH as a fixed value and remove the noise.

Effects

As described above, the decomposition unit 13 decomposes the first matrix in which the values of the elements are represented by the binary values into the coefficient matrix and the basic matrix. The estimation unit 14 estimates the element including the noise among the elements of the first matrix based on the result of the comparison between the second matrix obtained by combining the coefficient matrix with the basic matrix and the first matrix. In this manner, the noise estimation apparatus 10 estimates the element including the noise based on the result of the decomposition of the binary matrix. For this reason, according to the present embodiment, the binary matrix may be precisely decomposed.

The decision unit 12 decides the rank at which the description length based on the first matrix, and the coefficient matrix and the basic matrix obtained by decomposing the first matrix, satisfies the predetermined condition. The decomposition unit 13 approximately decomposes the first matrix under the rank decided by the decision unit 12. In this manner, the noise estimation apparatus 10 decides the optimal rank and decomposes the binary matrix to estimate the noise. For this reason, according to the present embodiment, the binary matrix may be precisely decomposed.

The estimation unit 14 estimates, as the noise, the element of the first matrix corresponding to the element where the value is true among elements of a third matrix obtained by the addition of the residue system of 2 of the second matrix and the first matrix. In this manner, the noise estimation apparatus 10 may easily identify the element including the noise by using the matrix of the noise having the same size as the original binary matrix.

The decomposition unit 13 decomposes the first matrix plural times by a technique with which the coefficient matrix and the basic matrix obtained by the decomposition do not have uniqueness. For example, the estimation unit 14 estimates, as the noise, the element of the first matrix corresponding to the element where the ratio of the values that are true is equal to or higher than a threshold among the elements of the third matrix obtained by the addition of the residue system of 2 of each of the multiple second matrices obtained by combining the coefficient matrix and the basic matrix obtained by the decomposition unit 13 with each other and the first matrix. In this manner, when multiple random decomposition results having no uniqueness are obtained, the noise estimation apparatus 10 may identify the element having a high probability of being noise.

The removal unit 15 removes the noise by inverting the value of the element estimated as the noise by the estimation unit 14 among the elements of the first matrix. In this manner, the noise estimation apparatus 10 may easily remove the noise.

Each time the element including the noise is estimated by the estimation unit 14, when the sum of the number of elements estimated as the noise is higher than the threshold, the removal unit 15 removes the noise from the first matrix. Each time the removal unit 15 removes the noise, the decomposition unit 13 further decomposes the first matrix. Each time the decomposition unit 13 decomposes the first matrix, the estimation unit 14 further estimates the element including the noise among the elements of the first matrix.

In this manner, the noise estimation apparatus 10 may improve the removal precision by repeating the noise removal.

EXPERIMENT RESULTS

Experiment 1

Figure 10:
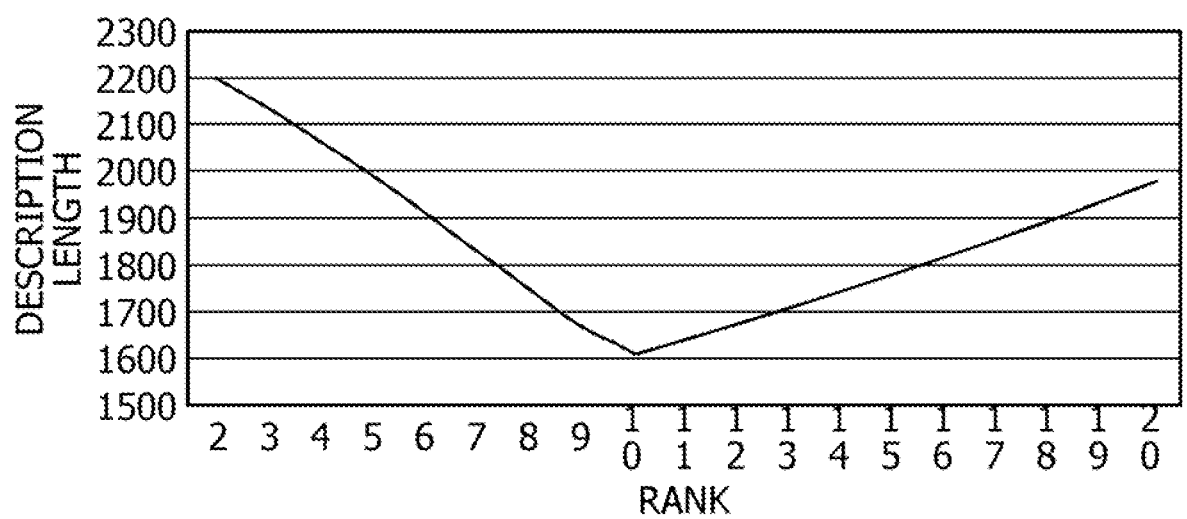
FIG. 10 is a diagram illustrating the description length for each rank in experiments.

Results of experiments using the noise estimation apparatus 10 according to the present embodiment are illustrated. First, in Experiment 1, the binary matrix V was used a noise-free binary matrix that is added noise at 5%, the noise-free binary matrix obtaining by combining the 10×50 matrix with the 50×10 matrix. Further, the noise-free binary matrix is binary matrix in which a ratio ρ with the element value of 1 is 50%. that the value of element was 1 being set 50%. In this case, as illustrated in FIG. 10, when the average description length is the lowest the rank takes the optimal value at 10. FIG. 10 is a diagram illustrating the description length for each rank in the experiments.

In accordance with the method described according to the embodiment, as a result of the estimation of the element including the noise in the aforementioned binary matrix V, a relevance factor P and a recall factor R were as illustrated in FIG. 11. FIG. 11 is a diagram illustrating the relevance factor and the recall factor in the experiments. As illustrated in FIG. 11, since the relevance factor P is high, it may be mentioned that erroneous estimation (erroneous detection) of the element that is not the noise as the element including the noise hardly occurs.

The relevance factor P and the recall factor R are calculated as follows.

Relevance factor P=(Number of rue noise among estimated noise)/(Number of estimated noise)

Recall factor R=(Number of true noise among estimated noise)/(Number of true noise)

Experiment 2

In Experiment 2, noise was removed from the binary matrix of the handwritten number data by the method described according to the embodiment (data obtaining source:https://archive.ics.uci.edu/ml/datasets/Multiple+Features), and image recognition was performed by a decision tree. At this time, the decided optimal rank was 10. FIG. 12 illustrates a 10-fold cross-validation error of decision tree learning. The cross-validation error is a real number from 0 to 1, and it may be mentioned that the recognition precision is higher as the cross-validation error is lower. As illustrated in FIG. 12, the cross-validation error, which was 0.32 before the noise reduction, is deceased to 0.25 after the noise reduction.

Supplemental Remarks regarding MCMC

The processing for decomposing the matrix by the MCMC by the noise estimation apparatus 10. According to the present embodiment, the noise estimation apparatus 10 uses simulated annealing corresponding to a type of the MCMC. The coefficient matrix W and the basic matrix H obtained by decomposing the matrix V by the MCMC do not have uniqueness. This is because it may be possible that a regular matrix X satisfying WXX$^{-1}$H is sandwiched between W and H. It is conceivable that multiple V' obtained by combining 100 ways of W and H with each other which are obtained by attempting the matrix decomposition by the MCMC 100 times, for example, are similar to each other. The elements that are not similar to each other among the elements of the multiple V' are considered to be equivalent to the noise.

Figure 13:
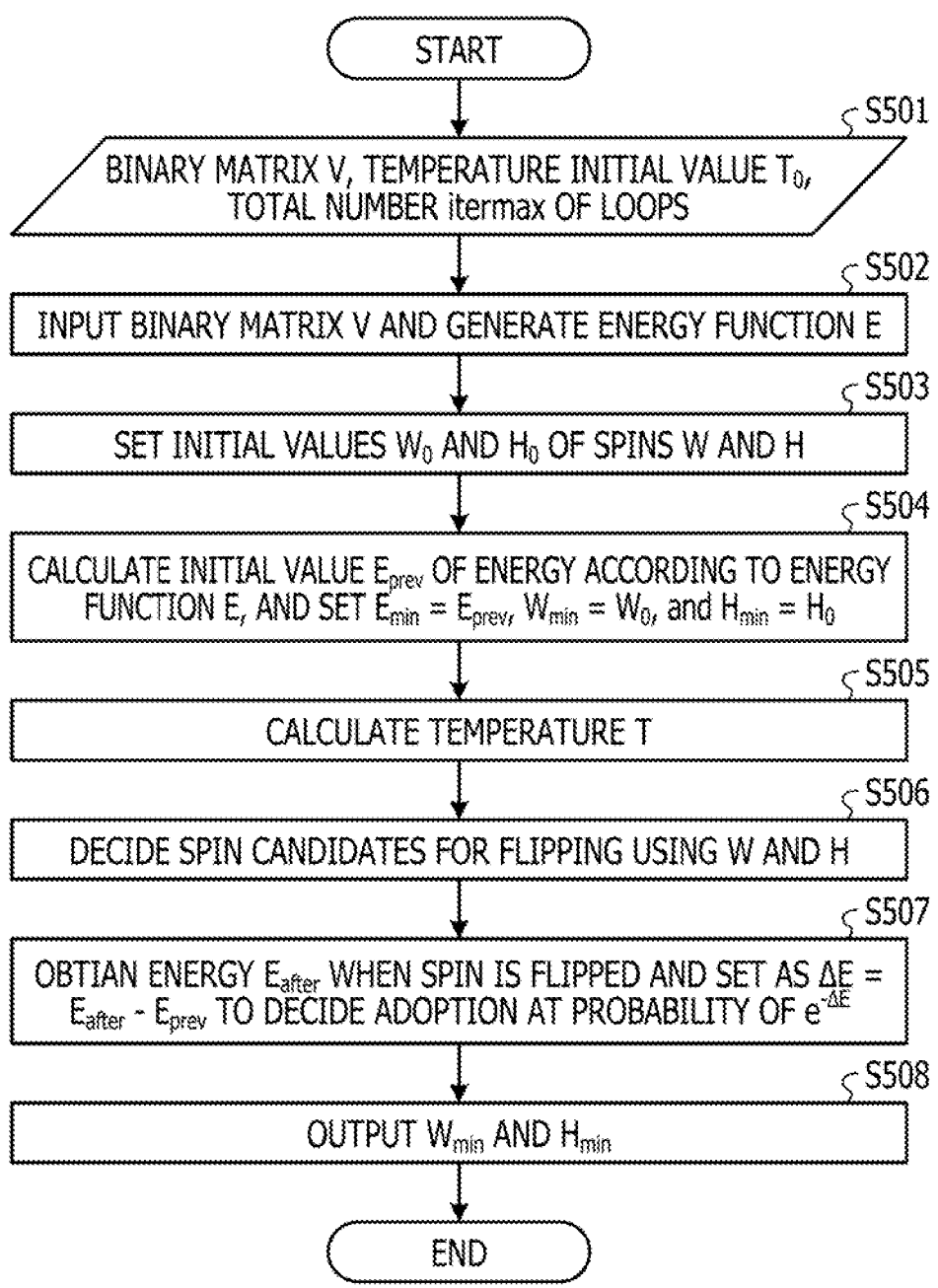
FIG. 13 is a flowchart illustrating a flow of processing for decomposing a matrix by Markov chain Monte Carlo methods (MCMC).

FIG. 13 is a flowchart illustrating a flow of the processing for decomposing the matrix by the MCMC. Descriptions are provided while the decomposition unit 13 is processing main body of the MCMC, but the decision unit 12 may also perform the MCMC. As illustrated in FIG. 13, first, the decomposition unit 13 receives the n×m binary matrix V, an initial value $T_0$ of temperature, and the total number itermax of loops (step S501).

The decomposition unit 13 inputs the binary matrix V, and generates an energy function E for matrix decomposition by Expression (8) (step S502).

[Expression 8]

$$E = \sum_{ij}(V_{ij} - (W \circ H)_{ij})^2 \quad (8)$$

The decomposition unit 13 sets any initial values $W_0$ and $H_0$ as spins W and H (step S503). The decomposition unit 13 calculates an initial value $E_{prev}$ of energy according to the energy function, and sets $E_{min}==E_{prev}$, $W_{min}=W_0$, and $H_{min}=H_0$ (step S504).

The decomposition unit 13 calculates a temperature T (step S505). For example, the decomposition unit 13 calculates the temperature T as in $T=T_0/\log(\text{iter})$. The decomposition unit 13 decides spin candidates for flipping by using W and H (step S506).

The decomposition unit 13 obtains energy $E_{after}$ when the spin is flipped and sets as $\Delta E=E_{after}-E_{prev}$ to decide the adoption at a probability of $e^{-\Delta E}$ (step S507). The decomposition unit 13 outputs $W_{min}$ and $H_{min}$ (step S508).

Process Upon Data Addition

When new data (instance) v is added to the input binary matrix V, the noise estimation apparatus 10 may calculate the coefficient matrix $W_j$ by MCMC by using the calculated basic matrix H, and calculate $e_j$ relevant to $v_j$.

Since the size of the binary matrix V is unchanged, when only one instance is added, the noise estimation apparatus 10 may overwrite the oldest data (instance) included in the binary matrix V. When a large number of instances to be added exist, the noise estimation apparatus 10 newly creates the binary matrix V. The noise estimation apparatus 10 sets only the spin of W as a target of flipping. In this case, the noise estimation apparatus 10 may treat H as a fixed number and perform the MCMC.

System

Processing procedures, noise estimation procedures, specific names, and information including various types of data and parameters indicated in the specification and the drawings may be freely changed unless otherwise specified. The specific examples, distributions, numerical values, and the like described according to the embodiment are merely examples, and may be freely changed.

The respective components of the respective apparatuses illustrated in the drawings are functional conceptual ones, and do not necessarily have to be physically configured as illustrated in the drawings. For example, specific forms of distribution and integration of the respective apparatuses are not limited to those illustrated in the drawings. For example, all or some of the apparatuses may be configured to be distributed or integrated functionally or physically in any units depending on various loads, usage conditions, and so on. All or any part of processing functions performed by the respective apparatuses may be realized by a central processing unit (CPU) and a program to be analyzed and executed by the CPU, or may be realized as hardware by wired logic.

Hardware

Figure 14:
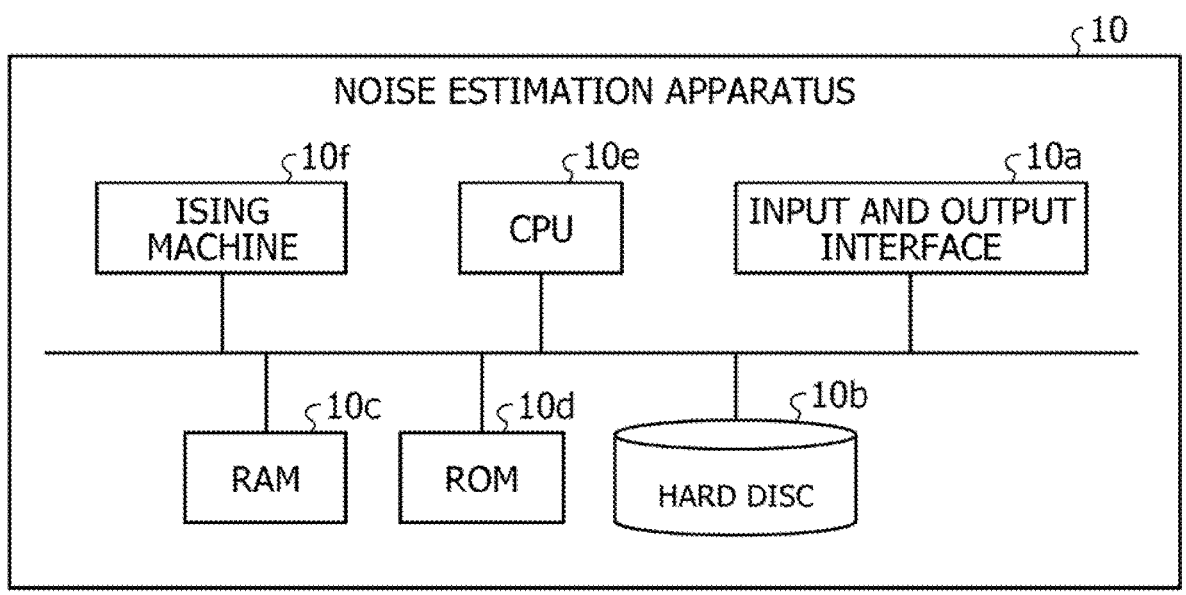
FIG. 14 is a diagram for describing a hardware configuration example.

The various processes described according to the foregoing embodiment may be realized by causing a computer to execute a program prepared in advance. In view of the above, an example of a computer (hardware) that executes a program having the same functions as those of the foregoing embodiment will be described below. FIG. 14 is a diagram for describing a hardware configuration example.

As illustrated in FIG. 14, the noise estimation apparatus 10 includes an input and output interface 10a, a hard disc 10b, a random-access memory (RAM) 10c, a read-only memory (ROM) 103, a CPU 10e, and an Ising machine 10f. The respective parts in the noise estimation apparatus 10 are coupled to a bus.

The input and output interface 10a is an input device such as a keyboard or a mouse that accepts an input operation from a user, and an output device such as a display that outputs various processing results. The hard disc 10b is, for example, a hard disc device, and a program for executing the various processes described according to the above embodiment is stored. Various types of data referred to by the program 111 are also stored in the hard disc 10b. The RAM 10c is used when the CPU 10e reads the program and executes various processes, and temporarily stores various information. The ROM 103 is a nonvolatile memory that stores a boot program or the like executed when the noise estimation apparatus 10 is activated, for example.

The CPU 10e reads the program stored in the hard disc 10b, and loads and executes the read program in the RAM 10c, thereby performing various processes relevant to the conversion unit 11, the decision unit 12, the decomposition unit 13, the estimation unit 14, the removal unit 15, the noise information 16, and the analysis unit 17. The program may not be stored in the hard disc device 10b. For example, the noise estimation apparatus 10 also may read and execute the program stored in a storage medium readable by the noise estimation apparatus 10. The storage medium readable by the noise estimation apparatus 10 corresponds to a portable recording medium such as a compact disc (CD)-ROM, a digital versatile disc (DVD), or a Universal Serial Bus (USB) memory, a semiconductor memory such as a flash memory, a hard disc drive, or the like. This program may be stored in a device coupled to a public line, the Internet, a LAN, or the like, and the noise estimation apparatus 10 may read the program from the device and execute the program.

The Ising machine 10f is a device that performs processing by the simulated annealing (SA), and searches for a combination (basis state) of a combination of respective bits with which a lowest value of a cost functions converted into an Ising format is obtained.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A noise estimation method comprising:
decomposing a first matrix including first elements into a coefficient matrix and a basic matrix, values of the elements being represented by binary values;
specifying a first element included in the first elements corresponding to a second element where a value is true among second elements of a third matrix that is based on the first matrix and a second matrix that is generated by combining the coefficient matrix with the basic matrix;
estimating the first element as an element including noise; and
removing the noise by inverting the value of the element estimated to include the noise by the estimating among the elements of the first matrix.

2. The noise estimation method according to claim 1, further comprising:
deciding a rank at which a description length based on the first matrix, and the coefficient matrix and the basic matrix obtained by decomposing the first matrix, satisfies a predetermined condition,
the decomposing includes decomposing the first matrix under the rank decided by the deciding.

3. The noise estimation method according to claim 1, wherein the estimating includes estimating, as the noise, the element of the first matrix corresponding to the element where the value is true among elements of a third matrix obtained by addition of a residue system of 2 of the second matrix and the first matrix.

4. The noise estimation method according to claim 1, wherein
the decomposing includes decomposing the first matrix plural times by a technique with which the coefficient matrix and the basic matrix obtained by the decomposition do not have uniqueness, and
the estimating includes estimating that the value of the element of the first matrix corresponding to the element where a ratio of the values that are true is equal to or higher than a threshold includes the noise among elements of a third matrix obtained by addition of a residue system of 2 of each of multiple second matrices obtained by combining the coefficient matrix and the basic matrix obtained by the decomposing with each other and the first matrix.

5. The noise estimation method according to claim 1, wherein the removing includes removing the noise from the first matrix when a sum of the number of elements estimated as the noise is higher than a threshold each time the element including the noise is estimated by the estimating, the decomposing includes further decomposing the first matrix each time the noise is removed by the removing, and the estimating includes further estimating the element including the noise among the elements of the first matrix each time the first matrix is decomposed by the decomposing.

6. A non-transitory computer-readable storage medium storing a program that causes a processor included in a noise estimation apparatus to execute a process, the process comprising:
decomposing a first matrix including first elements into a coefficient matrix and a basic matrix, values of the elements being represented by binary values;

specifying a first element included in the first elements corresponding to a second element where a value is true among second elements of a third matrix that is based on the first matrix and a second matrix that is generated by combining the coefficient matrix with the basic matrix;

estimating the first element as an element including noise; and removing the noise by inverting the value of the element estimated to include the noise by the estimating among the elements of the first matrix.

7. A noise estimation apparatus comprising:

a memory; and, a processor coupled to the memory and configured to:

decompose a first matrix including first elements into a coefficient matrix and a basic matrix, values of the elements being represented by binary values, specify a first element included in the first elements corresponding to a second element where a value is true among second elements of a third matrix that is based on the first matrix and a second matrix that is generated by combining the coefficient matrix with the basic matrix, estimate the first element as an element including noise, and remove the noise by inverting the value of the element estimated to include the noise by the estimating among the elements of the first matrix.

* * * * *